Sept. 6, 1966  C. D. CONE, JR  3,270,988
MINIMUM INDUCED DRAG AIRFOIL BODY
Filed Dec. 26, 1962  3 Sheets-Sheet 1

INVENTOR
CLARENCE D. CONE, JR.

BY
ATTORNEYS

INVENTOR
CLARENCE D. CONE, JR.

United States Patent Office 3,270,988
Patented Sept. 6, 1966

3,270,988
MINIMUM INDUCED DRAG AIRFOIL BODY
Clarence D. Cone, Jr., Hampton, Va., assignor to the United States of America as represented by the Administrator of the National Aeronautics and Space Administration
Filed Dec. 26, 1962, Ser. No. 247,423
3 Claims. (Cl. 244—35)

The invention described herein may be manufactured and used by or for the Government of the United States of America for governmental purposes without the payment of any royalties thereon or therefor.

The invention relates generally to airfoil bodies of improved aerodynamic efficiencies and, more particularly, to lifting systems of unconventional configurations and minimum induced drag. The aerodynamic theory and principles upon which the present invention is based are discussed in NASA T.R.–R139, published by applicant in approximately May 1962 and entitled "The Theory of Induced Lift and Minimum Induced Drag of Nonplanar Lifting Systems."

To successfully accomplish many modern aircraft missions, relatively high aerodynamic efficiencies are often required, even though the aircraft available for such missions frequently incorporate wings of relatively short span. Moreover, certain of these modern-day aircraft missions often require aircraft operation at relatively large coefficients of lift which, when associated with the relatively large induced drags characteristic of the relatively small wing spans frequently utilized therewith results in relatively low aerodynamic efficiencies. With the use of conventional, flat-span wings, the difficulty in obtaining high aerodynamic efficiencies is magnified when examined in light of the above-noted considerations. Furthermore, the problem can best be demonstrated by an analysis of the expression for the wing drag polar $$C_{D,w} = C_{Do} + \frac{C_L^2}{\pi kA}$$

where, $C_{Do}$, the profile drag coefficient, is a function of the coefficient of lift, $C_L$. Obviously, if the drag coefficient, $C_D$, is to be held to a minimum value, $C_{Do}$, the profile drag coefficient should be made as small as possible, and $kA$, the effective aspect ratio, as large as possible. However, this is an incompatible relationship, since the thickness ratio of the conventional flat-span wing also increases as the aspect ratio is increased. This increase in thickness ratio, in turn, effects an increase in the profile drag coefficient $C_{Do}$, and, accordingly, a point is ultimately reached where further increases in geometric aspect ratio (or span length) becomes, in fact, detrimental since the inherent increase in profile drag becomes large enough to cancel the beneficial effect of the reduction in induced drag. Furthermore, for a constant wing area the structural weight of the wing also increases with increases in aspect ratio, necessitating operation at higher coefficients of lift for a given flight dynamic pressure and payload weight, with a consequent increase in induced drag. Therefore, it is apparent that, since the aircraft or vehicle parasite-drag coefficient, $C_{Dp}$, can be considered independent of the particular lifting system being utilized therewith, further increases in aerodynamic efficiencies can be achieved only through the use of more efficient wing configurations. Accordingly, the present invention resolves this problem by analyzing unconventional or nonplanar wing configurations, or airfoil bodies in a unique and yet simplified manner which offers the advantage of reduced induced drag over that achieved by the optimum planar wing form. The latter is accomplished through use of an electric analog device which is effective even for the most complex forms.

Mathematically, various nonplanar wing forms may be analyzed for the purpose of comparing relative aerodynamic characteristics thereof including induced drag. For instance, an arbitrary circulation distribution may be assigned and the corresponding induced drag computed mathematically. Progress may be made from the more simple to the more complex forms. Moreover, the optimum circulation distribution for minimum induced drag of a selected nonplanar wing form may be determined by, initially, selecting an arbitrary length of a single-bound vortex arc representing, for example, a cambered-span airfoil. The previously mentioned arbitrary circulation distribution may then be prescribed and the arc, representing the wing form under investigation, considered as situated in a plane perpendicular to the steady freestream velocity. Further, since the vortex filaments composing the arc cannot terminate in the flow, a vortex sheet must emanate from the arc and the lift and induced drag, then, determined, through further computation; however, this method is quite unwieldy and time-consuming especially when more complex lifting forms are investigated. In the latter event, the machine analysis method of the present invention presents a far more simplified and yet unique method of achieving a reasonable comparison of the relative efficiencies of a variety of nonplanar forms. In other words, the optimum circulation distribution for minimum induced drag of a plurality of nonplanar wing forms may be easily and quickly determined and compared by means of the analog device of the present invention. The electric potential flow distribution is actually measured by the inventive analog and compared with analogous aerodynamic flow. Known aerodynamic theory and principles may then be applied to the values obtained by machine analysis to obtain the aerodynamic characteristics usable in the design of a particular wing form.

In connection with the hereinbefore mentioned "known" aerodynamic theory, the principle of vorticity attenuation which states that, although the total circulation of the wake vorticity of a simple flat lifting line, for example, cannot be altered, the kinetic energy content of the wake may vary considerably even for a constant circulation, must be satisfied before decreased induced drag can be expected. In addition, the effective aspect ratio ($kA$) may also be utilized for comparing the efficiencies of various wing configurations. Thus, if the same wing area $A$ and span $b$ of an elliptical planform flat-span wing (the optimum planar wing) of aspect ratio $A$ is used as a basis for calculating the coefficients of a nonplanar system of span $b'$, the induced drag polar for any nonplanar lifting system can be expressed as $$C_{Di} = \frac{C_L^2}{\pi A_{eff}} \text{ where } A_{eff} = kA, \text{ and}$$

where $k$ is an efficiency factor which remains constant so long as the optimum circulation distribution existing on the nonplanar system of span $b'$ can be compared with any flat-span, elliptical wing of span $b$ and area $S$. The circulation distribution required for the maximum effective aspect ratio can be also determined for symmetrical arc segments by means of a mathematical method known as "conformal transformation." In this method, the efficiency factors $k$ for a family of arc forms can be determined with considerable difficulty. This factor $k$ is most useful in comparing the relative aerodynamic efficiencies of a plurality of wing forms.

The electrical analogy method of the present invention is based on the fact that when electron flow is transmitted across a uniformly conducting sheet (two-dimensional flow), the resulting distribution of electrical potential has direct analogy to fluid flow. Thus, in the present invention, analogy can be made between aerodynamic and electric parameters, especially as between the efficiency factors K (aerodynamic) and $K_e$ (electric analog). An electric analog device is utilized for this purpose in the present invention in which the analogous electrical flow is measured and the values so obtained applied to known expressions. It is noted that the efficiency factor thereof may be then computed by means of a known expression as will be described hereinafter in more detail.

It is an object of the present invention, therefore, to produce an improved airfoil body configuration possessing decreased induced drag.

A further object of the invention resides in improved means for specifically determining the induced drag of a preselected airfoil body configuration.

A still further object of the invention provides electric analog means for determining the optimum circulation distribution of a preselected form or boundary representing the particular lifting system possessing the minimum induced drag.

An additional object of this invention resides in improved means for determining and thereby comparing the particular nonplanar wing configuration of a plurality of selected airfoil body configurations possessing the minimum induced drag.

Another object of the invention resides in the utilization of an airfoil body or wing configuration incorporating integral means of improved form for effecting decreased induced drag.

Other objects and advantages of the invention will become apparent from the following description, taken in connection with the accompanying drawings.

Figure 1:
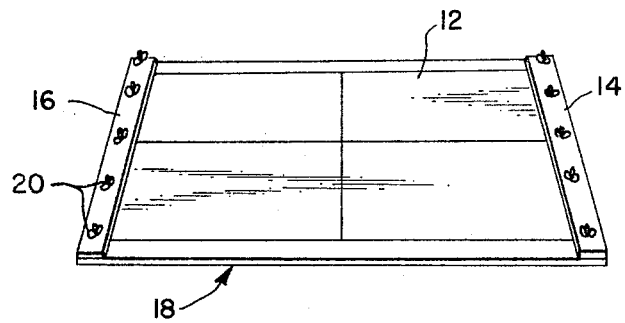
FIG. 1 is a top perspective view of the improved electric analog system of the present invention, illustrating the conducting sheet in assembled condition to its supporting base element.
Figure 2:
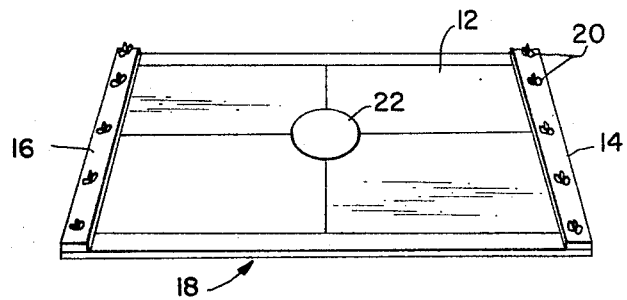
FIG. 2 is a second top perspective view of the improved analog system of FIG. 1 illustrating the assembled conducting sheet with the form or boundary representing the particular lifting system cut into the surface thereof.
Figure 3:
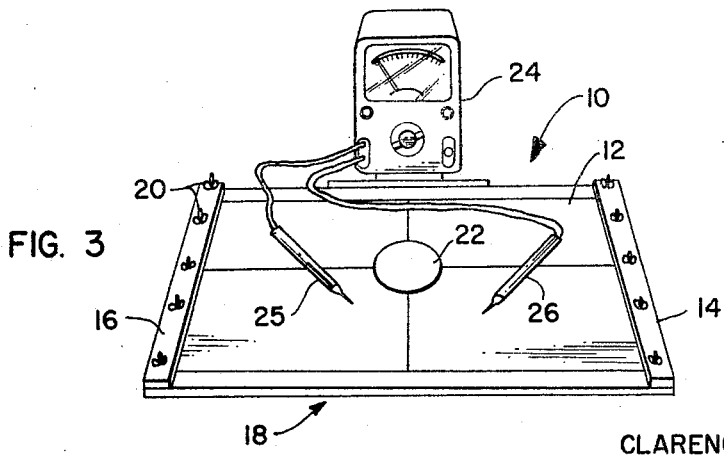
FIG. 3 is a third top perspective view of the fully assembled analog system of FIGS. 1 and 2 with a potential flow measuring device added thereto.

Referring to the drawings and particularly to FIGS. 1-3 thereof, the fully assembled electrical analog system of the present invention is indicated generally at 10 (FIG. 3) as including a sheet of uniformly conducting material 12 mounted between a pair of spaced, parallel electrodes 14 and 16 which form part of an open framework indicated generally at 18. Electrodes 14, 16, which may be in electrical circuit with a suitable power source (not shown), may be releasably attached on opposite sides of framework 18 by means of a plurality of fasteners indicated generally at 20 to facilitate rapid disassembly thereof from the framework 18 and thus permit easy interchanging of the conducting sheet 12 with additional sheets for the purpose of investigating and comparing results of a variety of wing forms. To utilize the inventive electric analog 10, the unmarked conducting sheet 12 is first assembled to the framework 18 (as in FIG. 1) in attached relation between the electrodes 14, 16 and, to construct the electrical potential flow analogous to the corresponding aerodynamic flow, the form or boundary representing the particular lifting system is then cut into the surface of sheet 12, in this case, the cut being circular in form as indicated at 22. However, the cut may be any nonplanar form, as desired. It is noted that the size of this boundary (22) is relatively small when compared with the total size of the sheet 12 itself. In this manner, the electrical flow adjacent the outer boundaries of sheet 12 remains undisturbed. The assembled conducting sheet 12 and the electrode-supporting framework 18 may then be placed in circuit with an appropriate power source and, as illustrated in FIG. 3, an electron voltmeter 24 utilized therewith to measure the electric potential flow relative to the lifting system boundary 22 cut into the surface of sheet 12. To accomplish the required flow measurement, voltmeter 24 is equipped with a pair of finely pointed electric probes at 25 and 26 and, when electron flow is transmitted between electrodes 25 and 26 across conducting sheet 12, the boundary cut 22 representing the particular lifting system causes the current flow thereabout to satisfy the same boundary conditions as for the case of the analogous fluid regime and the values of $\Delta E$ (the potential difference equivalent to the circulation distribution at the given point), $(\Delta E)_o$, the potential differences across the boundary center, and $$\left(\frac{dE}{dz}\right)_\infty$$

(the change in potential per unit length in the direction of the uniform current at infinity) may be read directly with the voltmeter 24.

To determine the efficiency of a selected nonplanar wing configuration, the aerodynamic efficiency factor $k$, found in the basic induced drag polar expression for any nonplanar form, where:

$$C_{Di} = \frac{C_L^2}{\pi k A}$$

may be determined from the expression, $$k = \frac{1}{\Psi^2 \pi} \frac{\left(\frac{\Gamma_o}{W_o}\right)}{\left(\frac{b'}{2}\right)} \int_{-1}^{1} \frac{\Gamma}{\Gamma_o} d\gamma$$

where $\Psi$ is the span ratio factor, $\Gamma_o$ is the value of circulation in the plane of symmetry, and $W_o$ is the complex potential function in the plane of symmetry. However, a convenient dimensionless constant K may be extracted from the above efficiency factor $k$ equation where, $$K = \frac{\left(\frac{\Gamma_o}{W_o}\right)}{\left(\frac{b'}{2}\right)} \int_{-1}^{1} \frac{\Gamma}{\Gamma_o} d\gamma$$

The electrical analog of this equation has been determined to be:

$$K_e = \frac{(\Delta E)_o}{\left(\frac{dE}{dz}\right)_\infty \frac{b'}{2}} \int_{-1}^{1} \frac{\Delta E}{(\Delta E)_o} d\gamma$$

It is noted that the dimensionless constant K includes everything in the efficiency factor expression $(k)$ except for the factor $1/\Psi^2 \pi$, where $\Psi$ is the span ratio, $b/b'$, where $b$ is the wing factor span of the flat wing being used as the basis for the efficiency comparison and $b'$ is the projected wing span of the nonplanar wing under consideration.

Thus, $K_e$, may be determined by experimentally measuring the factors contained in the expression therefor by means of the electric analog system 10 of the present invention, as hereinbefore indicated. Since K and $K_e$ are both dimensionless constants and constitute the analogous relationship for the aerodynamic and electric potential flow, they must have the same value for geometrically similar flows (equivalent boundary conditions). Thus $K_e$ may be experimentally determined by constructing the analogous electrical flow on the conducting sheet 12, in which is performed the specific boundary form, measuring the potential about this boundary form, and then applying the measured values so obtained to the above described expression for $K_e$. Since the latter is equal to the corresponding aerodynamic flow, the aerodynamic flow parameter K is equal to $K_e$. Finally, applying the value of K (determined as indicated above) to the expression for the efficiency factor $k$, and then applying this computed value of $k$ to the induced drag expression given hereinbefore, the induced drag analogous to the measured electric potential flow about the particular boundary form cut into the surface of conducting sheet 12 may be determined without resort to relatively complex complete mathematical analysis. In reality, the number of wing forms treatable by mathematical analysis is very limited and, for most configurations, the electric analog is the only means available for obtaining the optimum circulation distribution thereof.

Figure 4:
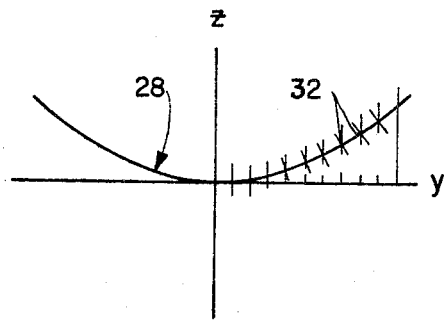
FIG. 4 illustrates a plot of an arbitrary arc form utilized with the apparatus of FIGS. 1-3.
Figure 5:
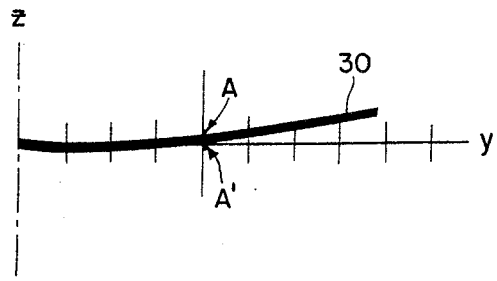
FIG. 5 illustrates the arbitrary arc form of FIG. 4 with the slit incorporated therein.
Figure 6:
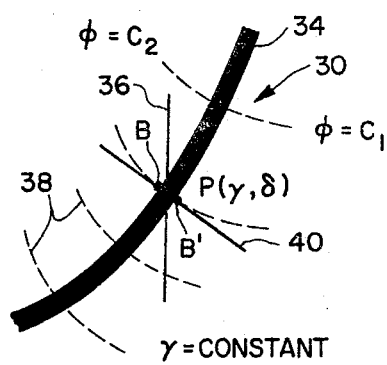
FIG. 6 illustrates the graphical method utilized with the invention to facilitate accurate measurement of the potential flow at a measuring station of an appreciable curvature portion of the arc form of FIGS. 4 and 5.

To further analyze use of the inventive electric analog 10, the arbitrary arc form 28 of FIG. 4 (corresponding to a given value of $\beta$, the camber factor) may be plotted on the conducting sheet 12 (FIG. 1) in place of the circular arc form 22. A very narrow slit 30 (FIG. 5) may then be cut along the arc form itself to form an electrical boundary of predetermined configuration. To measure the potential flow distribution along arc form 28, a plurality (in this case, a total of 11) of measuring stations 32 may be selected and the potential difference at each station measured by use of the finely pointed probes 25, 26. Theoretically, these measurements may be made at a single point. In practice, however, two separate measuring points are utilized at each station. Note, for example, points A and A' in FIG. 5. Measurement in this manner is relatively simple for the relatively flat portions (FIG. 5) of the arc form 28, for example. However, where slit 30 incorporates an appreciably curved portion (note, curved portion 34 in FIG. 6), the two measuring points become widely separated (as B and B' in FIG. 6) and measurement becomes progressively more difficult for measuring curved portions. In this event, a graphical method may be employed to insure proper positioning of electric probes 25, 26 during measurement. Thus, equipotential lines 38 (FIG. 6) must be normal to the boundary 30 in the immediate vicinity of the boundary. Accordingly, if ΔE, the difference in potential, is to be read on voltmeter 24 at measuring station 36, for example, a normal line (as at 40) may be constructed through the station 36 before boundary 30 is actually cut therein. As a result, the potential lines which would end on this point (36) will lie along normal line 40 in the vicinity of slit 30. The probes 25, 26, must, therefore, be placed at the intersection points B and B' of the normal line 40 with the opposite edges of the slit 30 to measure the electric potential flow of the particular nonplanar form (in this case, form 28) cut into the surface of the uniformly conducting sheet.

With the above described measurements obtained from use of electric analog 10, the value of $K_e$ may be computed in accordance with the previously referred to analog equation by integration of the potential difference distribution $$B_e = \int_{-1}^{1} \frac{\Delta E}{(\Delta E)_o} d\gamma$$

and by using the measured values of $$\left(\frac{dE}{dz}\right)_\infty$$

$b'/2$ and $(\Delta E)_o$. In practice, $$\left(\frac{dE}{dz}\right)_\infty$$

may be taken as the voltage difference across the sheet 12 divided by the distance (in this case 24") between the lines of contact of the electrodes 14, 16 for each individual reading. With this arrangement, it has been determined that semielliptical arc forms, for example, are considerably more efficient than circular arcs of equal span. It is noted that the use of the electric analog 10 has been considered for the semielliptical form only; however, arc forms of any shape may be analyzed by the analog method of the present invention without departing from the true spirit or scope of the invention.

More complex systems may also be investigated by the electric analog 10 of the present invention. For example, a flat-span wing configuration may be modified at the tip section to reduce the induced drag thereof. As an example, end plates or fins might be used. With such forms, a beneficial effect, from an induced drag standpoint, can be achieved, especially where relatively large end plates are utilized. In any event, no matter how complex a configuration under consideration, the above described analog method of analysis constitutes an effective and yet simple means for determining the efficiencies of various configurations.

Figure 7:
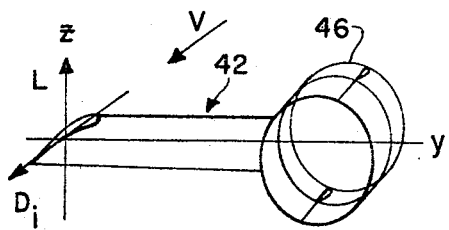
FIGS. 7 and 8 represent schematic showings of modified airfoil body configurations of the invention, illustrating the wing tip, respectively, terminating in closed circular and elliptical arcs.
Figure 8:
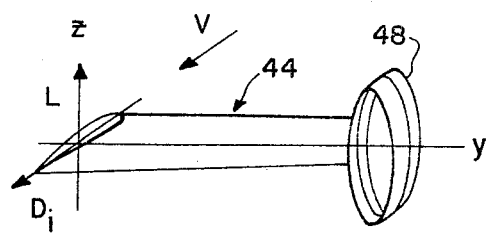

The wing tips may also be modified into a series of curved or closed-tip forms, representative examples of which will be described in more detail hereinafter. With use of such curved-tip forms, the outboard quarter of the semispan consists of a circular arc, the reaon therefor being to move the tip region of the wing, where the strongest vorticity is shed, away from the heavily loaded center of the span and thus reduce the downwash at the center. Relatively high values of efficiency ($k$) can be obtained with this method. With the closed-arc tip form as illustrated in FIGS. 7 and 8, for example, these airfoil configurations may consist essentially of a plane wing portion generally indicated at 42 and 44, respectively, terminating in a tip portion of closed-arc form (circular-arc form 46 in FIG. 7 and elliptical-arc form 48 in FIG. 8). Greatly increased efficiency factors $k$ can be achieved by use of these unconventional wing-tip forms, and at the same time, the inherent stability and low-drag characteristics of conventional-type wings are retained. These closed-arc tip forms (two examples of which are illustrated in FIGS. 7 and 8, as hereinbefore indicated) are easily investigated and compared in the specific manner hereinbefore outlined with reference to the electric analog 10. The circular-arc tip form of FIG. 7 may be varied by changing the diameter of the circle to achieve higher values of efficiency $k$ and increase the effective aspect ratio; also the elliptical form of FIG. 8 may be varied in size and orientation to likewise vary the efficiency and increase the effective aspect ratio. Further analysis, clearly revealed that the elliptical form of FIG. 8 (major axis oriented vertically) gives greater efficiency in increasing effective aspect ratio, in accordance with the principle of vorticity spreading. It is noted that these closed tips are not solid bodies, but are hollow to permit passage therethrough of the freestream air.

Figure 9:
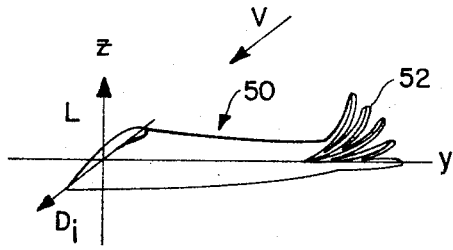
FIG. 9 represents a schematic showing of a modified airfoil body configuration of the invention, illustrating the wing tip split into a plurality of branches.

The wing tip section may be further modified into the branched tip form of FIG. 9 of the drawings wherein the tip section of the semispan 50 is split into a plurality of separate branches indicated generally at 52 which may be considered as an extension of the curved tip form referred to above. Through investigation of this form by the analog system 10 of the invention, the specific branched tip distribution representing or possessing the optimum circulation distribution producing minimum induced drag may be obtained. These separate lifting branches 52 serve to spread or attenuate the trailing vorticity of the wing over a much larger area than do end plates, for example, and are also much more efficient since they also produce lift. It is noted that the key feature of the branched tip configuration resides in the spreading of the trailing vorticity in a vertical plane, resulting from curving the individual branches in a vertical plane, in addition to splitting the wing tip into a number of individual branches. Thus, without the vertical dispersion of the plurality of tip branches, there would be no significant reduction in induced drag.

Figure 10:
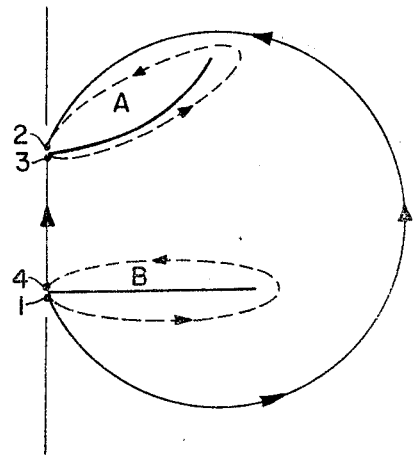
FIG. 10 represents the integration path determining the circulation corresponding to a given spanwise station for an arbitrary branched-tip form utilized with the electric analog of the present invention.

To facilitate use of the electrical analog 10 of the present invention for analysis of the branched tip wing form, each individual arc segment or separate branch or winglet is measured by positioning the electric probes 25 and 26 on opposite sides of each branch at a specific spanwise station, as is illustrated in FIG. 10 of the drawings. The circulation around each arc segment (A and B, for example) is thereby measured, and the total potential difference reading, $\Delta E$, is the sum of all such readings. Specifically, the pair of electric probes 25, 26 may be placed on points 1 and 4 to obtain the circulation around arc segment "B" and then on points 2 and 3 for arc segment "A," and the two readings (on voltmeter 24) added together. Alternatively, readings can be made at points 1 and 2 and points 3 and 4 separately and the results added algebraically to achieve the desired result.

Figure 11:
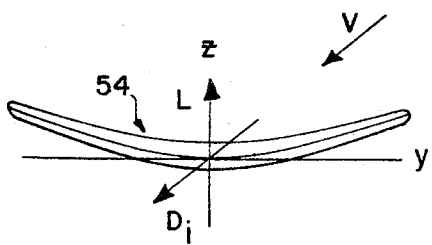
FIGS. 11 and 12 are schematic views of cambered span airfoil configurations of the type utilized in the present invention, illustrating circular arc and semi-elliptical cambers, respectively.
Figure 12:
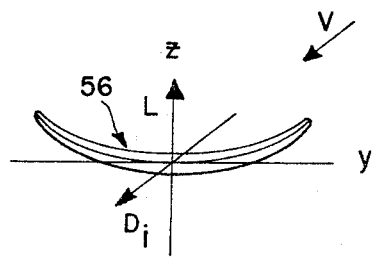

Of course, other and more varied wing configurations of nonplanar form may be investigated with facility and accuracy by the inventive electrical analog 10 without departing from the true spirit and scope of the invention. For example, the entire span may be modified as illustrated by the cambered span airfoil of circular-arc camber indicated generally at 54 in FIG. 11 or as illustrated by the cambered span airfoil of semielliptical-arc camber indicated at 56 in FIG. 12. Naturally, analysis may be made of a plurality of these configurations with great facility by the electrical analog 10 of the present invention to determine the most suitable specific configuration possessing the circulation distribution of minimum induced drag, eliminating the time-consuming operation of comparatively unwieldy mathematical analysis. The circular-arc camber form achieves increased drag reductions as the camber is increased, resulting, for example, in an increase in effective aspect ratio with the wind efficiency factor $k$ having a value of 1.50 for a semicircular span. For this case, the effective aspect ratio has been found 50 percent greater than is the geometrical aspect ratio of the elliptical planform wing of equal span. With the semiellipse form of wing span as in FIG. 12, even greater efficiencies may be expected for equal spans and camber depth to semispan relation. It is apparent, therefore, that gains in effective aspect ratio and efficiency can be achieved through even minor alterations of the wing tip region. Even greater gains can be obtained through radical modifications of the tip and, in some instances, more gains in efficiency can be achieved through modification of the wing tip itself rather than from a radical modification of the entire wing.

Thus, the electric analog system of the present invention offers a unique and improved system in which the analysis of a plurality of wings or airfoil bodies of nonplanar configurations for aerodynamic efficiency and induced drag is facilitated. Moreover, specific examples of nonplanar configurations are presented which incorporate unique modifications offering decreased induced drag and increased efficiency (increases in efficiency factor $k$ of 30–50 percent) over that of the optimum planform wing. Measurements are recorded by the inventive analog system and known aerodynamic theory and principles are applied to these measurements to achieve all of the aerodynamic characteristics necessary for the design of particular configurations having minimum induced drag.

I claim:

1. Improved means for reducing the induced-drag of a conventional wing configuration without excessively increasing wing surface areas comprising: a wing semispan of substantial planar configuration; and an unconventional split wing tip configuration having a plurality of separate winglets with different radii of curvature integrally formed with the wing semispan and collectively positioned vertically in a plane normal to the freestream velocity and disposed in the plane containing the wing span to insure reduced induced drag.

2. Means for reducing induced-drag on wings of conventional planform comprising: a wing semispan divided into a conventional semispan portion and an unconventional tip portion divided into a plurality of individual tip portions dispersed in a vertical plane normal to the freestream velocity and in the plane of the conventional semispan portion, each individual tip portion having a different radius of curvature and constituting a lifting element collectively attenuating the conventional vorticity of the wing over a wider area.

3. In a wing form of substantially conventional configuration, means for reducing the characteristic induced drag thereof comprising: a wing tip portion divided into individual tip elements rigidly formed to the wing semispan; each said tip having a different radius of curvature, whereby said tips are spread vertically relative to the direction of flow of the freestream velocity and disposed in the plane of the wing itself to insure increased lift and improved reduction in induced drag of the wing.

References Cited by the Examiner

UNITED STATES PATENTS

| | | | |
|---|---|---|---|
| 1,050,222 | 1/1913 | McIntosh | 244—35 |
| 1,841,921 | 1/1932 | Spiegel | 244—40 |
| 2,576,981 | 12/1951 | Vogt | 244—91 |
| 2,775,419 | 12/1956 | Hlobil | 244—35 |
| 2,805,830 | 9/1957 | Zborowski | 244—35 |
| 3,029,018 | 4/1962 | Floyd | 235—61.6 |
| 3,128,371 | 4/1964 | Spaulding et al. | 235—61.6 |

FOREIGN PATENTS 305,298  2/1929  Great Britain.

MILTON BUCHLER, *Primary Examiner.*

MALCOLM A. MORRISON, *Examiner.*

I. KESCHNER, T. MAJOR, *Assistant Examiners.*